United States Patent

Hanaki et al.

[11] Patent Number: 6,021,270
[45] Date of Patent: Feb. 1, 2000

[54] SYSTEM FOR GENERATING GEOMETRY OF OBJECT ASSOCIATED WITH ONE OF SIMILAR PRODUCTS, BASED ON GEOMETRICAL CHARACTERISTIC OF THIS ONE PRODUCT

[75] Inventors: Yasuhito Hanaki, Okazaki; Kazuhiro Sadamura; Toru Kato, both of Toyota, all of Japan

[73] Assignee: Toyota Jidosha Kabushiki Kaisha, Toyota, Japan

[21] Appl. No.: 08/866,349

[22] Filed: May 30, 1997

[30] Foreign Application Priority Data

May 30, 1996 [JP] Japan ..................................... 8-136105

[51] Int. Cl.⁷ ................................................. G06F 9/455
[52] U.S. Cl. ................................ 395/500.28; 395/500.29
[58] Field of Search .......................... 364/512; 345/418; 395/500.28, 500.27, 500.29

[56] References Cited

U.S. PATENT DOCUMENTS

| | | | |
|---|---|---|---|
| 4,641,270 | 2/1987 | Lalloz et al. | 364/468.04 |
| 5,251,290 | 10/1993 | Pabon | 345/420 |
| 5,552,995 | 9/1996 | Sebastian | 364/468.03 |
| 5,649,076 | 7/1997 | Nishizaka et al. | 345/419 |
| 5,659,478 | 8/1997 | Pennisi et al. | 364/468.01 |

FOREIGN PATENT DOCUMENTS

| | | |
|---|---|---|
| 7-49967 | 2/1995 | Japan . |
| 2 300 052 | 10/1996 | United Kingdom . |

OTHER PUBLICATIONS

Yang et al, "Mechanical Product Development Using a Multidisciplinary Modeling Approach", Proceedings of 1994 IEEE Region 10's Ninth Annual International Conference, pp. 957–961, Aug. 1994.

Primary Examiner—Kevin J. Teska
Assistant Examiner—Samuel Broda
Attorney, Agent, or Firm—Pillsbury Madison & Sutro LLP

[57] ABSTRACT

A product designing system performing a preliminary process for generating a geometry of one of products which have similar portions, and a subsequent process for generating a geometry of an object associated with that one product, the system including an input device for entering, in the subsequent process, at least one geometrical characteristic of the similar portion of the above-indicated one product, and a designing device for automatically generating the geometry of the object on the basis of a predetermined relationship between the geometrical characteristic and the geometry of the object, which relationship is stored in a memory.

19 Claims, 9 Drawing Sheets

SYSTEM FOR GENERATING GEOMETRY OF OBJECT ASSOCIATED WITH ONE OF SIMILAR PRODUCTS, BASED ON GEOMETRICAL CHARACTERISTIC OF THIS ONE PRODUCT

This application is based on Japanese Patent Application No. 8-136105 filed May 30, 1996, the content of which is incorporated hereinto by reference.

BACKGROUND OF THE INVENTION

1. Field of the Invention

The present invention relates in general to a technique for designing a product, and more particularly to a technique effective to reduce a time required for designing a product.

2. Discussion of the Related Art

Figure 9:
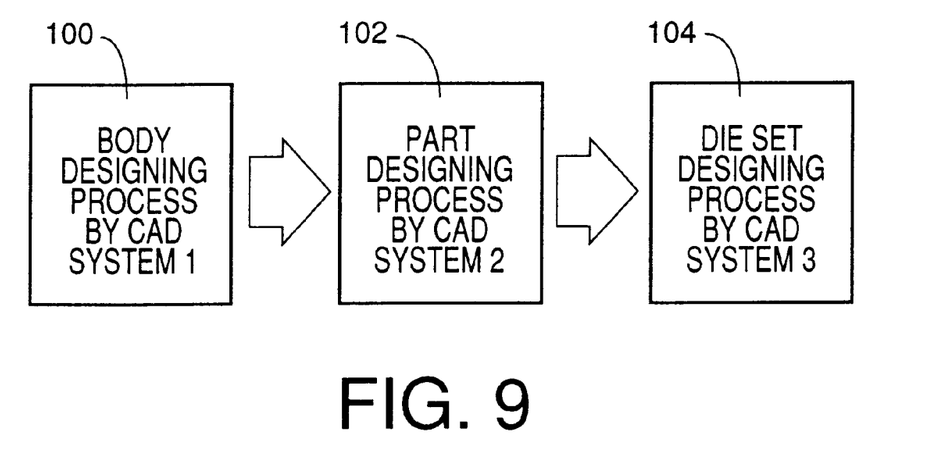
FIG. 9 is a view showing a plurality of designing processes relating to one product.

A product to be manufactured may be designed in a plurality of designing processes, which include a preliminary designing process wherein a geometry of a product is designed, and a subsequent designing process wherein a geometry of an object associated with the product in question is designed on the basis of the geometry of the product designed in the preliminary designing process. Where a part or component of a motor vehicle body is produced by pressing using a die set, for example, a body designing process 100, a part designing process 102 and a die set designing process 104 are sequentially performed in the order of description, as illustrated in FIG. 9. In the body designing process 100, an outer geometry of the vehicle body as a whole is designed. In the next part designing process 102, a part of the vehicle body is designed as an end product. In the last die set designing process 104, a geometry of a die set used for pressing a blank into the part is designed.

In the field of product designing, there is a strong need to reduce the required designing time. To meet such a need, there has been proposed a product designing system using a solid modeller, as disclosed in JP-A-7-49967, the subject matter of which is disclosed in U.S. patent application Ser. No. 08/286,570, one of the assignees of which is the assignee of the present application. This product designing system includes a preliminary designing process wherein cross sectional shapes and attributes for defining the geometry of a product to be manufactured are specified by an operator of the system, and a subsequent designing process in which the solid modeller is operated to automatically generate a solid model representative of the geometry of the product.

In the known product designing system indicated above, the subsequent designing process cannot be initiated until the preliminary designing process is completed. Therefore, where the designing procedure associated with a product includes a plurality of designing processes, the known product designing system has a limitation in its capability to reduce the required overall designing time.

Since the known product designing system is adapted to initiate the subsequent designing process after all items of designing information are finally determined in the preliminary designing process, the initiation of the subsequent designing process before the completion of the preliminary designing process would cause problems such as: requirement for considerable re-designing or correction of the product geometry in the subsequent designing process, in the event of some subsequent change of the designing information in the preliminary designing step; consequent increase in the designing time required for the subsequent designing process; and a risk of inaccuracy of design change in the subsequent process according to the change of the designing information in the preliminary process, and eventual product designing error due to incomplete or erroneous correction of geometry data in the subsequent designing process.

The required overall designing time may be reduced if computer-aided-design (CAD) systems used for the respective different designing processes have similar specifications following a common design concept which facilitates comparatively easier data communications between the different designing processes.

However, the use of such CAD systems having similar specifications based on a common design concept is actually difficult, since the functions to be performed by the individual CAD systems are different from each other, and therefore the CAD systems are not usually permitted to have similar specifications. Further, some existing product designing equipment includes CAD systems which have different specifications. In this case, modification of the systems so as to have similar specifications requires a lot of cost and time.

SUMMARY OF THE INVENTION

It is accordingly a first object of the present invention to provide a product designing system which permits significant reduction of the required overall time for product designing in a plurality of processes.

It is a second object of the invention to provide a recording medium which stores a program to be executed by a computer in the product designing system indicated above.

The first object may be achieved according to a first aspect of the present invention, which provides a product designing system performing a plurality of designing processes including a preliminary process in which a geometry relating to one of a plurality of products having similar geometries is generated, and a subsequent process which is effected after the preliminary process and in which a geometry relating to an object associated with the one of the plurality of products is generated on the basis of the geometry of the one product generated in the preliminary process, the product designing system comprising: (a) input means for entering, in the subsequent process, at least one geometrical characteristic of at least one selected portion of the one product whose geometry is similar to corresponding portions of the other of the plurality of products; (b) a memory storing a predetermined relationship between the at least one geometrical characteristic of the one product and the geometry relating to the object, which geometry is generated in the subsequent process; (c) a designing device for automatically generating the geometry relating to the object in the subsequent process, on the basis of the at least one geometrical characteristic and according to the predetermined relationship; and (d) an output device for providing an output representative of the geometry relating to the object.

In the preliminary process, various elements of the geometry of a desired one of the similar products are determined or defined one after another, in a given time period. If the geometry relating to the object associated with the product in question can be automatically generated by the designing device in the subsequent process, in relation to the already determined elements of the geometry of the product in question, the subsequent process can be initiated before the completion of the preliminary process, that is, before all of the geometrical elements of the product in question have been determined. The geometry relating to the above-indicated object can be generated in the subsequent process in relation to the geometrical elements of the product that have been already determined in the preliminary process, only where these geometrical elements relate to a portion or portions of the product in question which is/are similar in geometry to the corresponding portion(s) of the other products. In this case, there exists a predetermined relationship between the geometry of the object and the already determined geometrical elements of the product, irrespective of which one of the similar products is the product in question. Based on this predetermined relationship, the geometry of the object can be defined in the subsequent process on the basis of a characteristic or characteristics relating to some of the geometrical elements of the product which have already been defined in the preliminary process. In this case, therefore, the subsequent process can be initiated to automatically generate the geometry of the object before the preliminary process is completed, that is, before all of the geometrical elements of the product in question have been defined to complete the designing of the product in the preliminary process. Thus, the subsequent process can be performed concurrently with the preliminary process.

The geometry of the product to be designed in the preliminary process is not identical with the geometry of the object associated with the product, which is generated in the subsequent process. For instance, the object whose geometry is generated in the subsequent process is a die set used for press forming the product in question designed in the preliminary process. Since the products to be designed in the preliminary process have similar portions whose geometrical characteristics are used in the subsequent process, the corresponding die sets whose geometries are generated in the subsequent process have similar portions, so that the geometry of the object (die set) associated with the product in question can be automatically generated in the subsequent process on the basis of the geometrical characteristic or characteristics of the selected portion of the product in question whose geometry is similar to the corresponding portions of the other products.

Based on the above finding, the product designing system according to the present invention is adapted to deal with any one of a plurality of products having similar portions which are similar in geometry to each other, and automatically generate a geometry relating to an object associated with the product in question, in the subsequent process, on the basis of at least one geometrical characteristic of the similar portion of that product which portion has been designed in the preliminary process.

In the present product designing system, therefore, the subsequent process can be initiated before completion of the preliminary process, provided the characteristic of the similar portion of the product in question can be obtained at some point in the preliminary process. Since the subsequent process can be initiated before all geometrical elements of the product have been defined in the preliminary process, the preliminary and subsequent processes are concurrently performed for a given portion of the preliminary or subsequent process. If the geometry of the product in question is changed in the preliminary process after the subsequent process is initiated before the completion of the preliminary process, the geometry of the object associated with the product can be readily changed automatically by the designing device, by simply manipulating the input device to change the geometrical characteristic in the subsequent process, according to the change of the appropriate geometrical element or elements of the product in the preliminary process.

Since the subsequent process can take place concurrently with a terminal portion of the preliminary process, the required overall time necessary for the plurality of designing processes can be significantly reduced.

Further, the present product designing system assures automatic and reliable changing of the geometry of the object associated with the product in question, in the even of a change of the design of the product in the preliminary process after the subsequent process is initiated before the completion of the preliminary process.

The "geometry relating to one of a plurality of products" may be the geometry of this one product, and the "object associated with" the product may be a device used for manufacturing the product, such as a press forming die set, a forging die, and molds for casting and injection molding.

Where the product in question is manufactured in two or more processes using different die sets or forging dies, the "geometry relating to one of a plurality of products" may be the geometry of the product or the geometry of the press forming die set or forging die used in a preliminary pressing or forging process (drawing or rough forging process), while the "object associated with" the product may be an intermediate product obtained by the first pressing or forging process, or the press forming die set or forging die used in a subsequent pressing or forging process (finishing process).

The "at least one geometrical characteristic" may be a characteristic or characteristics relating to the position and/or the configuration of a peripheral portion, a reinforced portion or a perforated portion of the product in question. The reinforced portion may include ribs, beads, or other reinforcing means in the form of pipes and rods, for example. The perforated portion is a portion which has openings or apertures formed therethrough. Usually, the different products have similar peripheral portions, similar reinforced portions and/or similar perforated portions. These peripheral, reinforced and perforated portions are examples of "at last one selected portion" of the product in question, whose geometry is similar to the corresponding portions of the other products. The plurality of products may be a plurality of corresponding similar parts of bodies of different motor vehicles.

Alternatively, the geometrical characteristic may be a characteristic relating to the position or configuration of a portion of the product whose geometry is determined depending upon a required property of that portion, a function of the product in question, a relationship of the product with the object, and a geometry of any member or part with respect to which the product is positioned during use. For instance, the geometry of a comparatively highly rigid portion (such as the reinforced portion indicated above) is determined or influenced by the required rigidity of that rigid portion. Where the product in question is used in an apparatus or equipment such that a given portion of the product is located adjacent to any member or part of the apparatus or equipment, the geometry of that portion of the product is determined or influenced by a required relationship of that portion with the adjacent member or part. For instance, a given portion of the product should be located in contact with or spaced a predetermined distance apart from, the adjacent member or part. The above-indicated portions of the product whose geometries are influenced by the above-indicated factors are usually designed at an initial stage of the preliminary process, and are frequently also provided on the other products.

The "object" may comprise a plurality of members whose geometries relate to each other. In this case, the designing device is adapted to automatically generate, in the subsequent process, the geometries of the plurality of members in relation to each other. Since this arrangement permits coordinated generation of the geometries of the individual members of the object in a predetermined geometrical relationship with each other in the subsequent process, the time required for designing the individual members of the object in the subsequent process can be considerably reduced. Accordingly, the present arrangement combined with the partial concurrence of the preliminary and subsequent processes permits further reduction of the overall time required for the preliminary and subsequent processes. For instance, the object consists of a die set used for manufacturing the product in question. The die set includes an upper die and a lower die as the plurality of members, whose geometries are generated in relation to each other.

In one preferred form of the product designing system of this invention, the above-indicated at least one geometrical characteristic of the above-indicated at least one selected portion of the product in question includes at least one characteristic point defining at least one of a configuration, a size and a position of the at least one selected portion. In this case, characteristic point is defined by coordinate values in a coordinate system in which the object is defined.

The geometrical characteristic of the product may be defined by lines or surfaces which define the configuration, size and position of a portion or portions of the product whose geometry is similar to the corresponding portions of the other products. However, the definition of the geometrical characteristic by the lines and/or surfaces requires entry of more complicated data and more complicated manipulation by the operator, than the definition of the geometrical characteristic by points. Where CAD systems used for the preliminary and subsequent processes have different specifications, data communications between these CAD systems are difficult where the geometrical characteristic is defined by lines and/or surfaces.

In view of the above, the above-indicated first preferred form of the product designing system of the present invention is adapted to define each geometrical characteristic of the selected portion or portions of the product by a characteristic point or points defining at least one of the configuration, size and position of each selected portion. Each characteristic point is defined by the coordinate values in the coordinate system in which the object is defined.

The use of the characteristic points to define the characteristic of the product facilitates data communications between CAD systems used for the preliminary and subsequent processes, even where these CAD systems have different specifications. Generally, the geometric definition by points does not require complicated data conversion according to the specifications of the CAD systems.

In a second preferred form of the product designing system of this invention, the product whose geometry is generated in the preliminary process is manufactured by using a die set or a mold, and the object consists of the die set or the mold whose geometry is generated in the subsequent process.

In the above form of the invention, the overall time required for designing the product to be manufactured by the die set or mold is reduced.

In the above case, the product may be a part of a body of a motor vehicle, and is manufactured by pressing using the die set, which includes an upper die and a lower die.

In a third preferred form of the product designing system of the invention, the above-indicated at least one geometrical characteristic of the above-indicated at least one selected portion of the product includes at least one product characteristic point indicative of a position of each of at least one characteristic portion of the product as the above-indicated at least one selected portion. In this case, the designating device is adapted to determine a reference position on the basis of the position of each characteristic portion indicated by the at least one characteristic point, and generate a geometry of the die set or the mold, on the basis of the determined reference position.

In one arrangement of the above form of the invention, the die set or the mold includes at least one basic component which contributes to defining the geometry of the product, and at least one auxiliary function component which relates to an operation of the die set or the mold. In this instance, the designing device receives at least one functional characteristic point indicative of a position relating to a positional arrangement of the auxiliary function component or components with respect to the basic component or components, and determines the position of each auxiliary function component, on the basis of the position indicated by the functional characteristic point or points.

The first object indicated above may also be achieved according to a second aspect of this invention, which provides a product designing system for designing a geometry of each of a plurality of products having similar geometries, comprising a device for designing a geometry of one of the plurality of products, in relation to at least one geometrical characteristic thereof, and a device for designing a geometry of another of the plurality of products, by modifying the already designed geometry of the above-indicated one product by changing the at least one geometrical characteristic of the above-indicated one product to at least one geometrical characteristic of the above-indicated another product.

The second object indicated above may be achieved according to a second aspect of this invention, which provides a recording medium to be used for a product designing system adapted to perform a plurality of designing processes including a preliminary process in which a geometry relating to one of a plurality of products have similar geometries is generated, and a subsequent process which is effected after said preliminary process and in which a geometry relating to an object associated with the above-indicated one of the plurality of products is generated on the basis of the geometry of the above-indicated one product generated in the preliminary process, the recording medium storing a program such that the program is readable by a computer and is executed by the computer, for automatically generating the geometry relating to the object, on the basis of at least one geometrical characteristic of at least one selected portion of the above-indicated one product whose geometry is similar to corresponding portions of the other of the plurality of products, and according to a predetermined relationship between the above-indicated at least one geometrical characteristic of the above-indicated one product and the geometry relating to the object.

The recording medium according to this second aspect of the present invention is used with a computer provided in a product designing system as described above, and the program stored in the recording medium is executed by the computer in the subsequent process. The subsequent process in which the program is executed by the computer can be initiated before the completion of the preliminary process, for the reason explained above in detail with respect to the product designing system. Accordingly, the overall designing time required for the preliminary and subsequent processes can be significantly reduced.

For instance, the recording medium may be selected from among a floppy disc, a magnetic tape, a magnetic disc, a magnetic drum, a magnetic card, an optical disc, a magneto-optical disc, a CD-ROM, an IC card, and a perforated tape.

BRIEF DESCRIPTION OF THE DRAWINGS

The above and optional objects, features, advantages and technical and industrial significance of this invention will be better understood by reading the following detailed description of a presently preferred embodiment of the invention, when considered in connection with the accompanying drawings, in which.

DETAILED DESCRIPTION OF THE PREFERRED EMBODIMENT

Referring to the accompanying drawings, there will be described one embodiment of a product designing system of this invention, including a CAD system for designing a die set used on a pressing machine for manufacturing a part of a body of a motor vehicle. This vehicle body part is considered a product to be manufactured, and the die set is considered to be an object associated with the product, more precisely, associated with the manufacture of the product.

Figure 1:
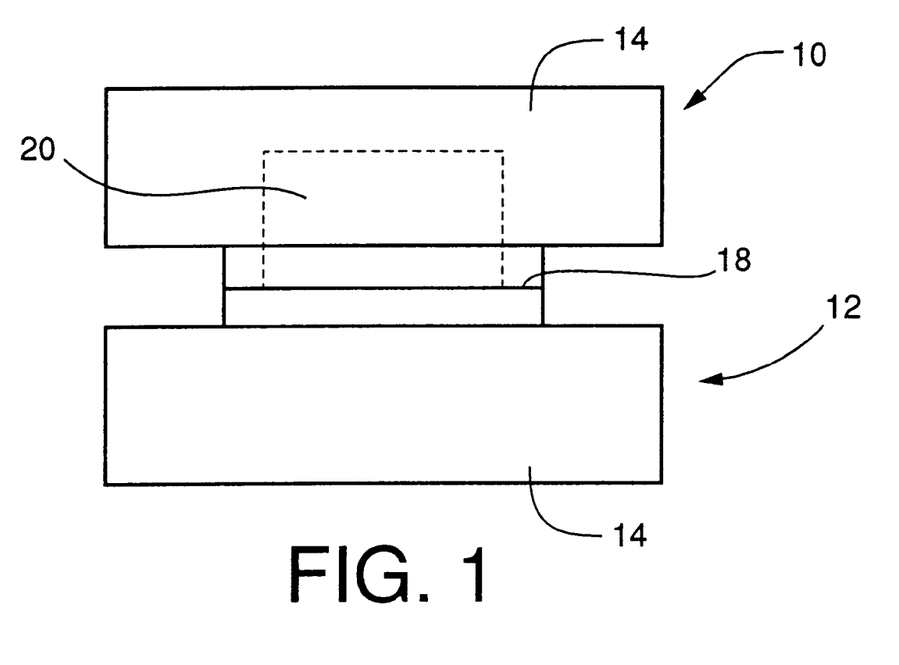
FIG. 1 is a front elevational view of a die set for a pressing machine, which is designed by a CAD system according to one embodiment of this invention.
Figure 2A:
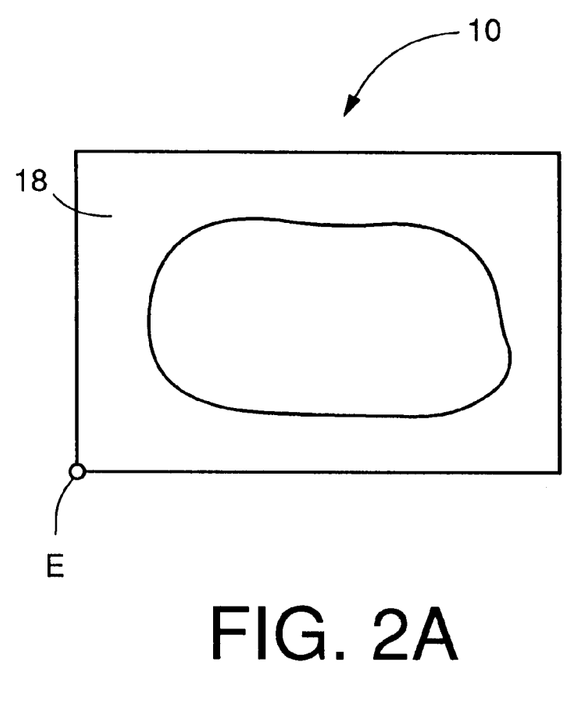
FIGS. 2A and 2B are plan views of an upper die and a lower die of the die set of FIG. 1.
Figure 2B:
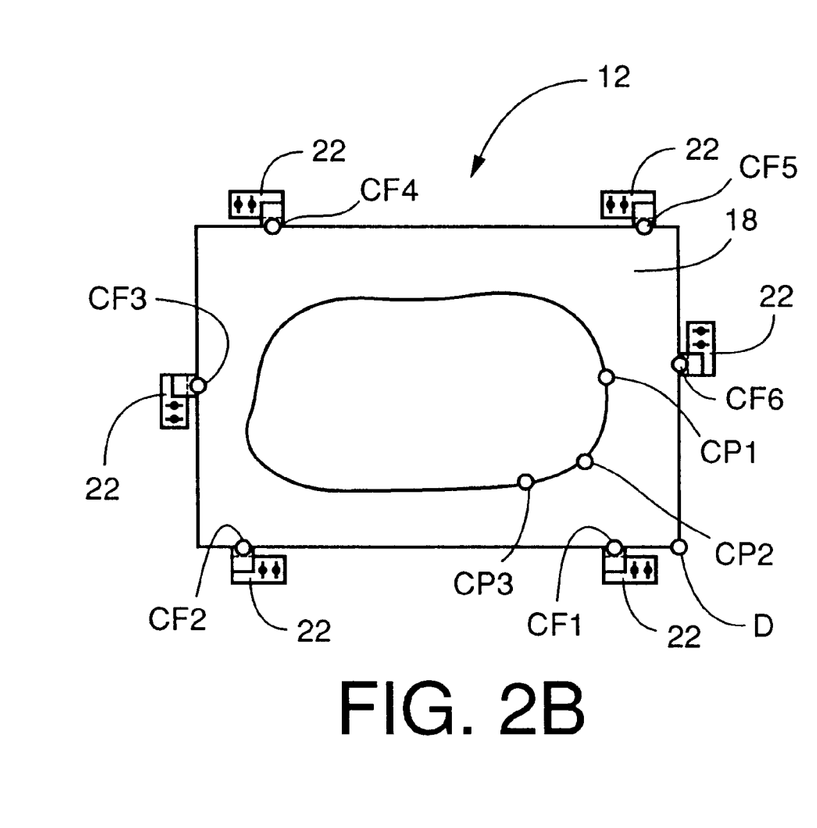

The die set includes an upper die 10 and a lower die 12, as show in FIG. 1. These dies 10, 12 cooperate with each other to perform a pressing operation on a generally planar workpiece or blank, for manufacturing the product, namely, a part of the vehicle body, such as an inner panel of an engine hood. In the pressing operation, the die set 10, 12 functions to form and cut the blank into a desired shape. Each of the upper and lower dies 10, 12 includes a base portion 14 having a plurality of surfaces which include a die face 18. The die faces 18 of the upper and lower dies 10, 12 have bending and cutting edges for forming and cutting the blank, and include forming surfaces for directly defining the geometry of the product. The die faces 18 further have generally annular pressure surfaces for holding a peripheral portion of the blank therebetween during the pressing operation. The plan view of FIGS. 2A and 2B show the upper and lower dies 10, 12, respectively. The upper die 10 incorporates a pad 20 for holding the blank within a cavity defined by the upper and lower dies 10, 12 when these dies are placed in a closed position, as indicated in FIG. 1.

Thus, the die set has three components in the form of the upper and lower dies 10, 12 and the pad 20. The upper and lower dies 10, 12 function as basic components which contribute to defining the geometry of the product.

Figure 3:
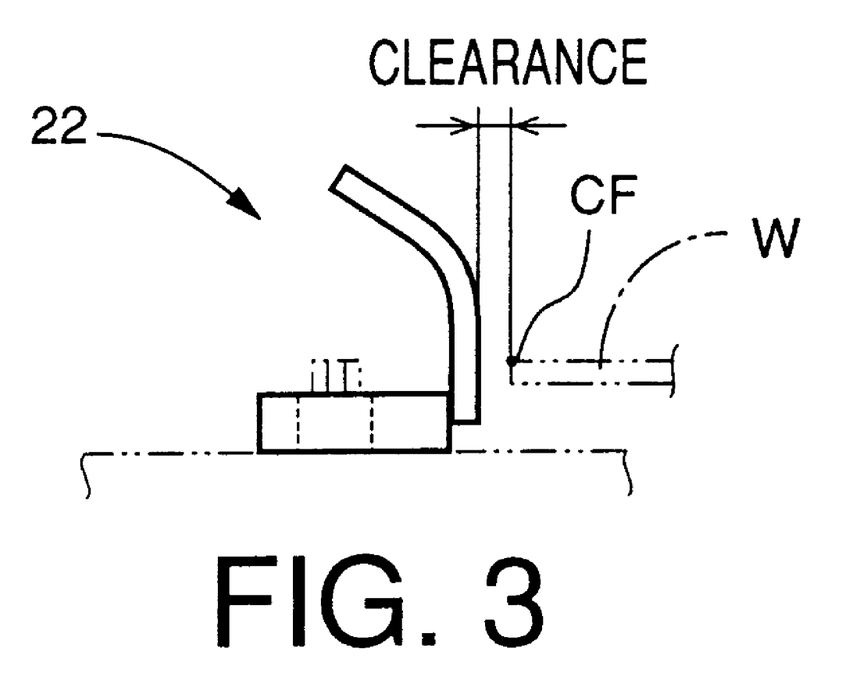
FIG. 3 is a front elevational view showing a gage 22 of FIG. 2B in enlargement.

In addition to the basic components 10, 12, the die set also has auxiliary function components for facilitating an automatic pressing operation in an intended fashion. The auxiliary function components include, for example, gages, proximity switches, limit switches, cams and guide posts. The lower die 12 is provided with the gages as indicated at 22 in FIG. 2B. The gages 22 are disposed adjacent to the periphery of the blank, for positioning the blank W with respect to the dies 10, 12 with a suitable clearance between each gage 22 and the periphery of the blank W, as shown in FIG. 3.

Figure 4:
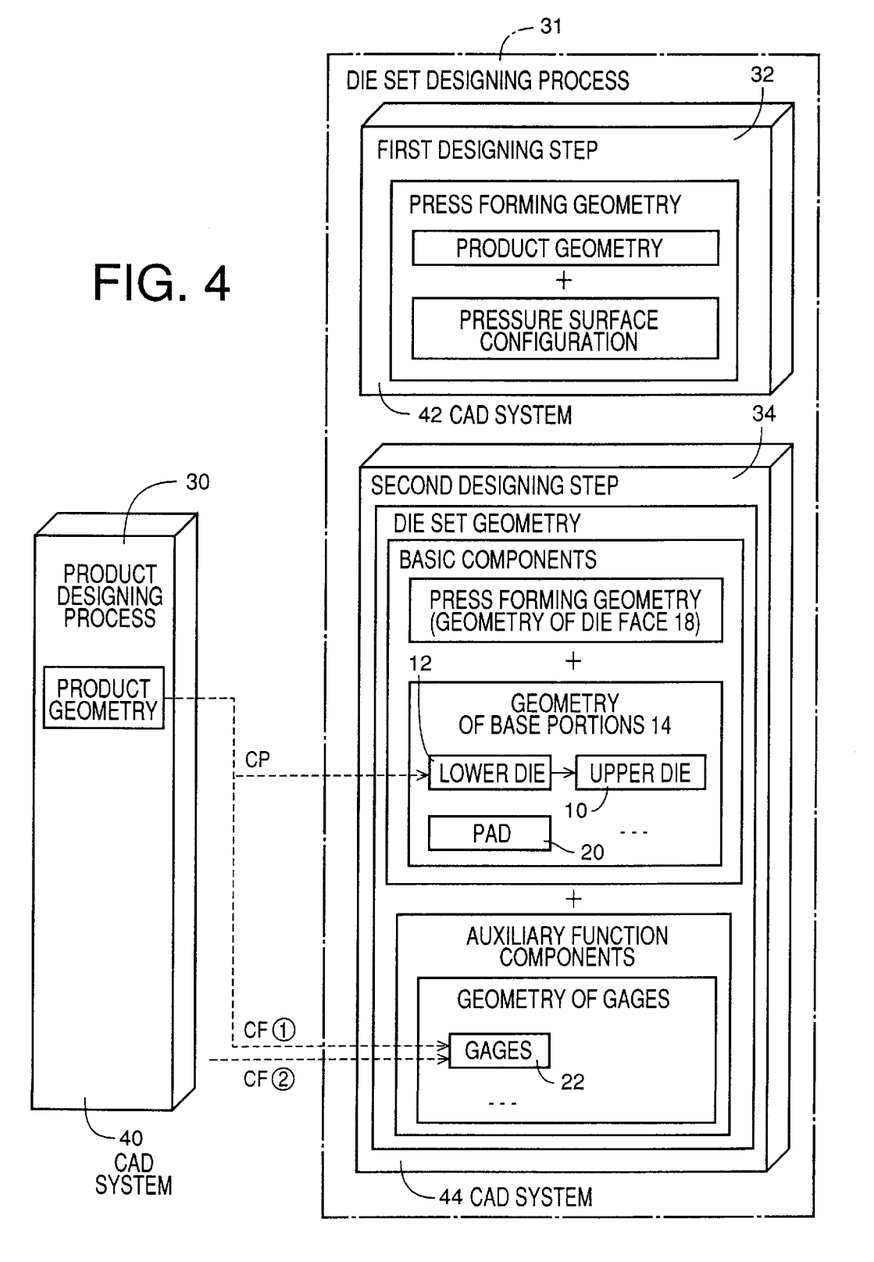
FIG. 4 is a view indicating a die set designing process 31 including a second designing step 34 implemented by the CAD system 44 indicated above, and a vehicle body designing process 30 which precedes the die set designing process.

Referring next to FIG. 4, there are depicted a product designing process 30 and a die set designing process 31 which are associated with each other in a series fashion, for designing a die set for manufacturing a part of a motor vehicle body.

The product designing process 30 is a process of generating the geometry of a part or component (e.g., engine hood) of a vehicle body, on the basis of the geometry of the vehicle body which has been generated in another designing process such as the body designing process 100 shown in FIG. 9. The geometry of the part of the vehicle body will be referred to simply as "product geometry" where appropriate.

The die set designing process 31 includes a first designing step 32 and a second designing step 34. The first designing step 32 is formulated to generate the configuration of the pressure surfaces of the dies 10, 12, on the basis of the product geometry generated in the product designing process 30. The configuration of the pressure surfaces and the product geometry cooperate to define a press forming geometry, that is, the geometries of the die faces 18. The second designing step 34 is formulated to generate geometries of the base portions 14 (except the die faces 18) of the dies 10, 12, on the basis of the product geometry generated in the product designing process 30. The geometries of the base portions 14 cooperate with the press forming geometry (geometries of the die faces 18) to define a geometry of the die set 10, 12, 20. For each basic component 10, 12 of the die set, the press forming geometry (geometries of the die faces 18) and the geometries of the base portions 14 are generated. For each auxiliary function component 22, only the geometry of the component 22 is generated.

The product designing process 30 and the designing steps 32, 34 of the die set designing process 31 are aided by respective CAD (computer-aided-design) systems 40, 42, 44, which have specifications suitable for performing intended operations with high efficiency in the respective designing process and steps 30, 32, 34. Described more specifically, the CAD system 40 is suitable for designing various parts of a vehicle body in the product designing process 30, and the CAD system 42 is suitable for generating the press forming geometry in the first designing step 32 of the die set designing process 31, while the CAD system 44 is suitable for generating the die set geometry in the second designing step 34 of the die set designing process 31.

Figure 5:
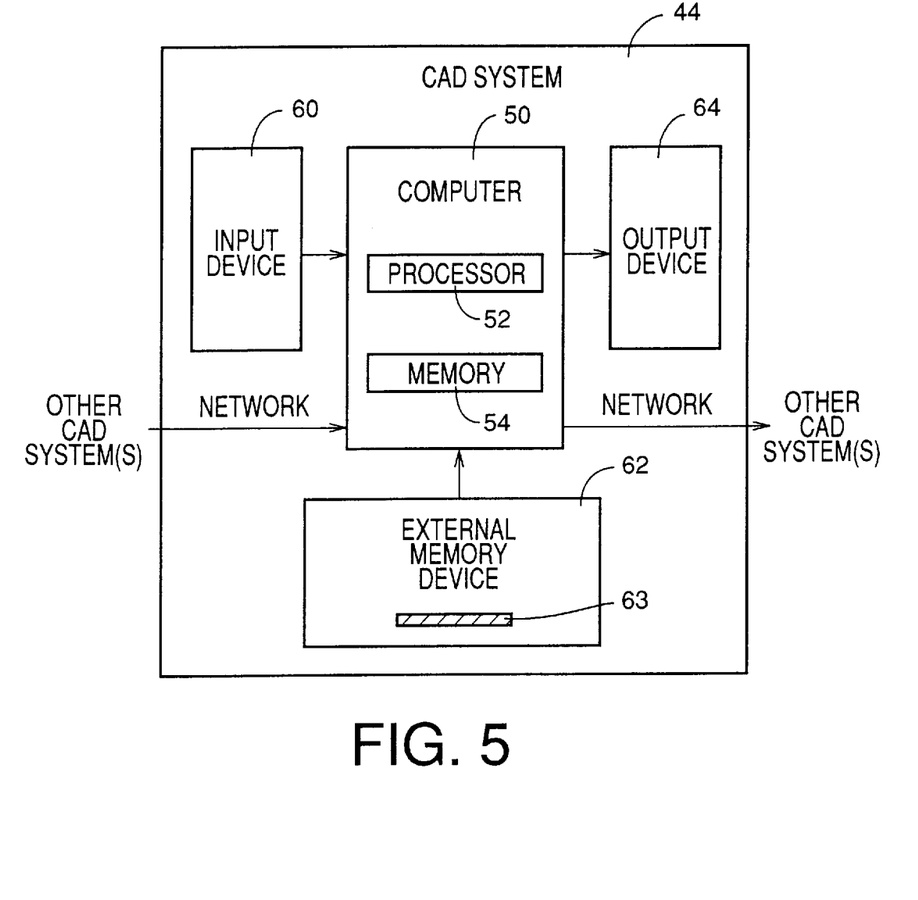
FIG. 5 is a block diagram illustrating the CAD system 44 of FIG. 4.

In particular, the principle of the present invention applies to the CAD system 44 used for the second designing step 34 of the die set designing process 31. The CAD system 44 is constituted principally by a computer 50 incorporating a processor 52 and a memory 54. The processor 52 is adapted to execute an appropriate die set designing program temporarily stored in the memory 54. To the computer 50, there is connected an input device 60 which includes a keyboard and a mouse, for example. The operator of the CAD system 44 manipulates the input device 60 for entering various kinds of data, which include data indicative of designers' concepts in designing the products. An external memory device 62 is also connected to the computer 50. The external memory device 62 is adapted to transfer programs and data from a recording medium 63 such as a floppy disc to the computer 50. Also connected to the computer 50 is an output device 64 including a display, a printer, or a plotter, and a combination thereof, for example. The output device 64 is provided to produce an output representative of the geometry of the die set generated by the computer 50. The CAD system 44 is connected through a network to other CAD systems such as the CAD systems 40, 42, for data communications therebetween.

The recording medium 63 of the external memory device 62 stores the above-indicated die set designing program for aiding the designing operation in the second designing step 34 of the die set designing process 31. This program is transferred to the memory 54 and is temporarily stored therein, so that the program is executed by the processor 52. The die set designing program will be briefly described.

The CAD system 44 is adapted to generate geometries of die sets used for manufacturing similar products used for different models of motor vehicles. That is, these products (vehicle body parts, such as engine hood panels) are standardized in shape and have respective geometries which are similar to each other. Accordingly, the geometries of the die sets for such standardized products are more or less similar to each other. Therefore, the geometries of the products to be generated by the CAD system 44 and the geometries of the base portions 14 of the die set 10, 12, 20 have predetermined relationships. Further, the geometries of the base portions 14 of the die set 10, 12, 20 are automatically generated by the CAD system 44, in relation to selected characteristics of the product geometries, in the second designing step 34 of the die set designing process 31, which is preceded by the product designing process 30. This preliminary product designing process 30 is formulated to initially design, or initially define the geometries of, predetermined portions of each product, such as: peripheral portions having outer profiles; relatively highly rigid portions which assure sufficient rigidity of the product as a whole; and adjoining portions which are located adjacent to other members or parts (members or parts of the same motor vehicle) when the product in question is installed on the appropriate vehicle, in a predetermined geometrical relationship with the other members or parts.

Therefore, the CAD system 44 is adapted to deal with the characteristics of the similar geometries of the above-indicated peripheral portion, highly rigid portions and adjoining portion of the different products (similar body parts of different vehicle models). Further, the CAD system 44 is adapted to express or define the characteristics of the product geometries (geometries of the above-indicated portions of each product), by using product characteristic points CP in a three-dimensional rectangular coordinate system in which the die set is defined. Each of the peripheral, highly rigid and adjoining portions of the product indicated above is defined by at least one product characteristic point CP which indicates at least one of the configuration, size and position of the product.

For specifying the characteristic of the peripheral portion of the product in the CAD system 44, the operator enters a plurality of points, for example, points CP1, CP2 and CP3, which generally define the outer profile or outline of the product, as indicated in FIG. 2B. Namely, the coordinate values of the points CP1-CP3 in the coordinate system are entered into the CAD system 44, as the product characteristic points CP, through the input device 60.

Since there exists a predetermined relationship between the configuration of the peripheral portion of the product and the configuration of the corresponding peripheral portion of the base portions 14 of the die set 10, 12, 20, as described above, the entry of the product characteristic points CP1-CP3 into the CAD system 44 permits the CAD system 44 to automatically determine the position of one of the four corner points which define the periphery of the base portion 14 of the lower die 12, for instance, the position of the corner point D indicated in FIG. 2B, according to the predetermined relationship. Based on the position of the corner point D of the lower die 12 automatically determined as a reference position by the CAD system 44, the position of the corresponding corner point E of the upper die 10 can be automatically determined by the CAD system 44. These corner points D and E are aligned with each other when the upper and lower dies 10, 12 are installed in place on a pressing machine.

Thus, the positions of all of the four corner points of the peripheral portion of the lower die 12 are automatically determined on the basis of the product characteristic points CP, and the positions of the corresponding four corner points of the upper die 10 are automatically determined on the basis of the positions of the corner points of the upper die 12. Further, the geometry of the pad 20 is automatically determined by the geometry of the upper die 10. With the product characteristic points CP given to the CAD system 44, the mutually relating geometries of the components 10, 12, 20 of the die set are automatically determined by the CAD system 44. While the present embodiment is adapted such that the geometries of the upper die 10 and the pad 20 are determined by the geometry of the upper die 12 initially determined on the basis of the product characteristic points CP, the geometries of the upper die 10 and the pad 20 may be determined directly on the basis of the product characteristic points CP.

While the CAD system 44 is arranged to generate or define the geometries of the basic components 10, 12 of the die set in relation to the product characteristic points CP, as indicated in FIG. 4, functional characteristic points CF are used to generate or define the geometries of the functional components 22 of the die set, that is, to determine the positions of the gages 22. Described in detail, the gages 22 are disposed to position the blank W, with a suitable amount of clearance between each gage 22 and the peripheral edge of the blank W, as shown in FIG. 3. Points having a predetermined positional relationship with the peripheral edge of the blank W are selected as the functional characteristic points CF, and the positions of the gages 22 are determined by these functional characteristic points. Each gage 22 has a predetermined configuration (shape and size), irrespective of its position. Once the functional characteristic point CF is given, the gage 22 having the predetermined configuration is translated in the coordinate system, to a position determined by the functional characteristic point CF. Thus, the geometry (configuration and position) of each gage 22 is automatically determined.

The functional characteristic points CF are either determined automatically by the CAD system 44, or manually by the operator of the CAD system 44. In the automatic determination, the functional characteristic points CF are determined on the basis of the product characteristic points CP. For instance, the functional characteristic point CF1 for the gage 22 near the lower right corner D of the upper die 12 as indicated in FIG. 2B is automatically determined on the basis of the product characteristic point CP2 (which is nearest to the point CF1 of the three product characteristic points CP1-CP3). However, the functional characteristic point CF1 may be determined by the product characteristic point CP1 as well as the characteristic point CP2. On the other hand, the automatic determination of the functional characteristic points CF may cause an error in the relative position between the gages 22 and the product produced by pressing with the die set, when the positions of the functional characteristic points CF and the positions of the gages 22 are changed in response to a change of the positions of the product characteristic points CP. In the manual determination of the functional characteristic points CF, the operator of the CAD system 44 specifies these points CF, depending upon the product geometry and and its relationship with the gages 22 (e.g., predetermined clearance between the product and the gages).

Figure 6:
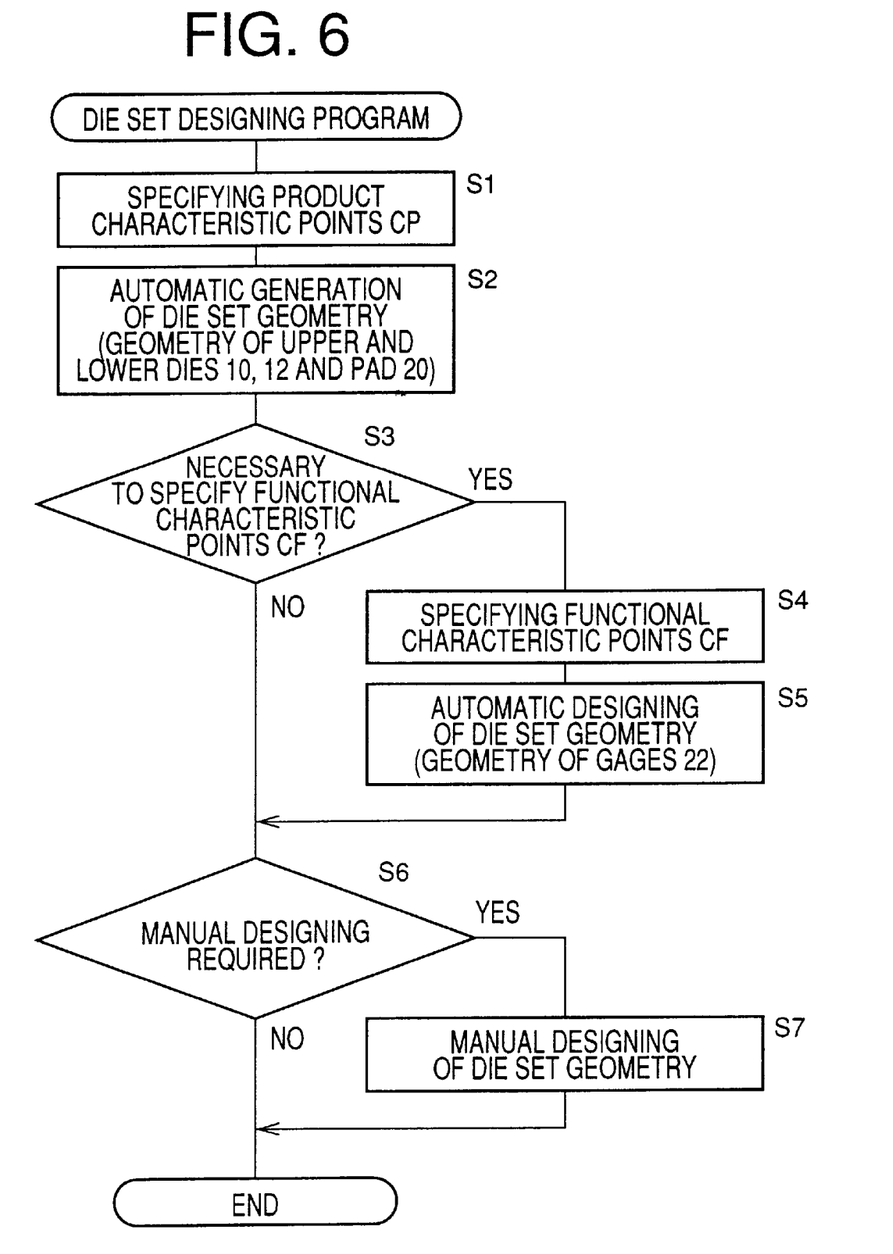
FIG. 6 is a flow chart illustrating a program executed by a computer of the CAD system 44.

There will next be described the die set designing program executed by the CAD system 44, by reference to the flow chart of FIG. 6.

A routine according to the program is initiated with step S1 in which the product characteristic points CP (coordinate values of these points CP) are specified by the operator and entered into the computer 50 through the input device 60. The operator specifies these product characteristic points CP on the basis of geometric information received from the CAD system 40 through the network. Step S1 is followed by step S2 in which the CAD system 44 operates to automatically generate the geometries of the upper and lower dies 10, 12 and pad 20 on the basis of the product characteristic points CP, and according to predetermined relationships between these points CP and the die set geometry (more precisely, the outer profiles of the dies 10, 12 and pad 20). Equations or data maps representative of these relationships are stored in the recording medium 63 and read into the memory 54 of the computer 50.

Then, the control flow goes to step S3 to prompt the operator to specify the functional characteristic points CF to define the position of the functional components such as the gages 22 of the die set 10, 12, 20. If a negative decision (NO) is obtained in step S3, the control flow goes to step S6. If an affirmative decision (YES) is obtained in step S3, the control flow goes to step S4 in which the operator specifies the functional characteristic points CF (enters the coordinate values of these points CF) through the input device 60. Step S4 is followed by step S5 in which the CAD system 44 automatically generates the geometries of the gages 22 on the basis of the functional characteristic points CF, and according to predetermined relationships between these points CF and the geometry of each gage 22. Equation or data maps representative of these relationships are also stored in the recording medium 63 and read into the memory 54. Thus, the die set geometry is generated by the CAD system 44 on the basis of the product and functional characteristic points CP and CF specified by the operator.

Steps S3 and S5 are followed by step S6 to prompt the operator to effect any manual designing operation for finalizing the geometry of the die set 10, 12, 20. If a negative decision (NO) is obtained in step S6, one cycle of execution of the routine of FIG. 6 is terminated. If an affirmative decision (YES) is obtained in step S6, the control flow goes to step S7 in which the operator of the CAD system 44 enters appropriate data for manually defining the geometry of the die set.

If the product geometry is changed in the product designing process 30 after the die set geometry is generated, the positions of the product characteristic points CP and/or the functional characteristic points CF are changed, so that the die set geometry is automatically changed by the CAD system 44, according to the changed positions of the characteristic points CP, CF.

The die set designing program described above is used and executed before the product characteristic points CP and the functional characteristic points CF have not been specified yet, namely, executed where the product geometry generated in the product designing process 30 do not include data representative of the size and outer profile of the base portions 14 of the upper and lower dies 10, 12 and the positions of the auxiliary functional components such as the gages 22. However, the recording medium 63 stores the data representative of the predetermined relationships between the points CP, CF and the geometries of the die set (including the positions of the gages 22). With the characteristic points CP, CF specified by the operator during execution of the die set designing program, the CAD system 44 automatically generates the die set geometry on the basis of the specified points CP, CF.

The present die set designing program may also be used and executed where the characteristic points CP, CF have been already specified to define the die set geometry for a given first product, but where the operator of the CAD system 44 (the designer of a product) wishes to generate the geometry of the die set for another or a second product, by modifying or changing the already specified characteristic points CP, CF relating to the first product. For instance, the designer wishes to generate the geometry of a die set for press forming a part of the body of a vehicle model A, where there exists the already generated geometry of a die set for a corresponding part of the body of a vehicle model B, which part is similar to the part of the vehicle model A. In this case, the geometry of the die set for the part of the vehicle model A can be efficiently generated by the CAD system 44, by simply changing the coordinate values of the characteristic points CP, CF already specified for the part of the vehicle model B, so that the changed points CP, CF meet the die set for the part of the vehicle model A.

Figure 7:
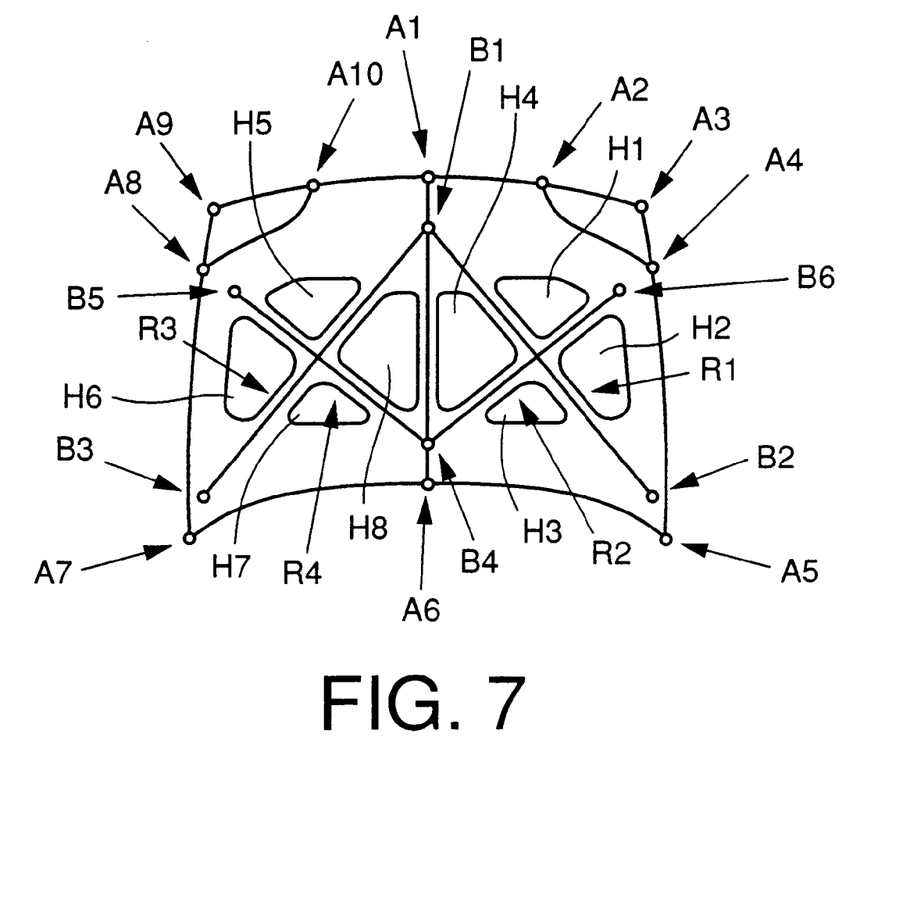
FIG. 7 is a front elevational view showing a product in the form of an inner panel of an engine hood which is manufactured by pressing using a die set to be designed by the CAM system 44.

Referring to FIG. 7, there is schematically shown an example of a part of the body of a motor vehicle, which is an inner panel of an engine hood. Generally, the engine hood is a frame construction consisting of an outer panel and an inner panel which are welded together. The inner panel is a generally planar member having a generally rectangular outer profile. The inner panel has a plurality of openings H which are formed by cutting during a press forming operation, for reducing the weight of the engine hood. For reinforcing a perforated portion of the inner panel through which the openings H are formed, the inner panel has a plurality of ribs R around the openings H. The portions of the inner panel including the ribs R considered to be comparatively highly rigid portions or reinforced portions of the inner panel. The CAD system 44 can be used to design a die set for press forming this inner panel of the engine hood, as described below.

As the geometrical characteristics of the inner panel of the engine hood of FIG. 7, the outer profile, the positions of the rib R (highly rigid portion) and the positions of the openings H are used to define the geometry of the inner panel. The CAD system 44 is arranged to operate on the assumption that a plurality of vehicle models have similar inner panels, that is, the inner panels of the different vehicle models are similar in the following points: 1) The inner panels have generally rectangular outer profiles; 2) The inner panel of each vehicle model has four ribs R arranged so as to form two pairs of ribs R which are disposed symmetrically with each other with respect to the longitudinal centerline and each of which consists of two criss-crossed ribs R; and 3) The inner panel of each vehicle model has eight openings H arranged so as to form two groups of openings H which are disposed symmetrically with each other with respect to the longitudinal centerline and each of which consists of four openings H located in respective areas divided by the corresponding pair of two criss-crossed ribs R.

To define the outer profile of the inner panel of a given vehicle model, a plurality of points A1–A10 generally defining the outer periphery of the inner panel are specified as the product characteristic points CP in the coordinate system. Since there exists a predetermined relationship between the outer profile of the inner panel and the outer profile of the die set used for press forming the inner panel, the product characteristic points CP specified by the operator enables the CAD system 44 to automatically generate the outer profile of the die set (i.e., peripheries of the upper and lower dies 10, 12), on the basis of the specified characteristic points CP and the predetermined relationship stored in the memory 54. While the points A1, A2, A4–A8 and A10 lie on the periphery of the inner panel, the points A3 and A9 are slightly offset from the periphery in the outward direction, for optimizing the geometries of the components of the die set. It is noted that hinges are attached to the engine hood, at the points A5 and A7. Thus, these points A5, A7 determine the position of the inner panel with respect to the adjacent member of the vehicle to which the hinges are also attached.

To define the positions of the four ribs R as another geometrical characteristic of the inner panel, opposite end points B1-B2, B1-B2, B4-B5, B4-B6 of each of the four ribs R are specified as the product characteristic points CP in the coordinate system. Since each rib R has a predetermined cross sectional shape, the geometry of the portion of the die set corresponding to each rib R is automatically generated by the CAD system 44, on the basis of the opposite end points B of each rib R and the predetermined cross sectional shape. It is noted that the engine hood is locked in its closed position on the vehicle, at the point B1, and the inner panel is provided with urethane rubber members at the points B2-B6.

To define the positions of the eight openings H of the inner panel, substantially central points of the openings H are specified as the product characteristic points CP in the coordinate system. Since the configuration or outer periphery of each opening H has a predetermined relationship with the adjacent ribs R, the geometry of the portion of the die set corresponding to each opening H can be automatically generated by the CAD system 44, on the basis of the substantially central point CP and the predetermined outer periphery.

Figure 8:
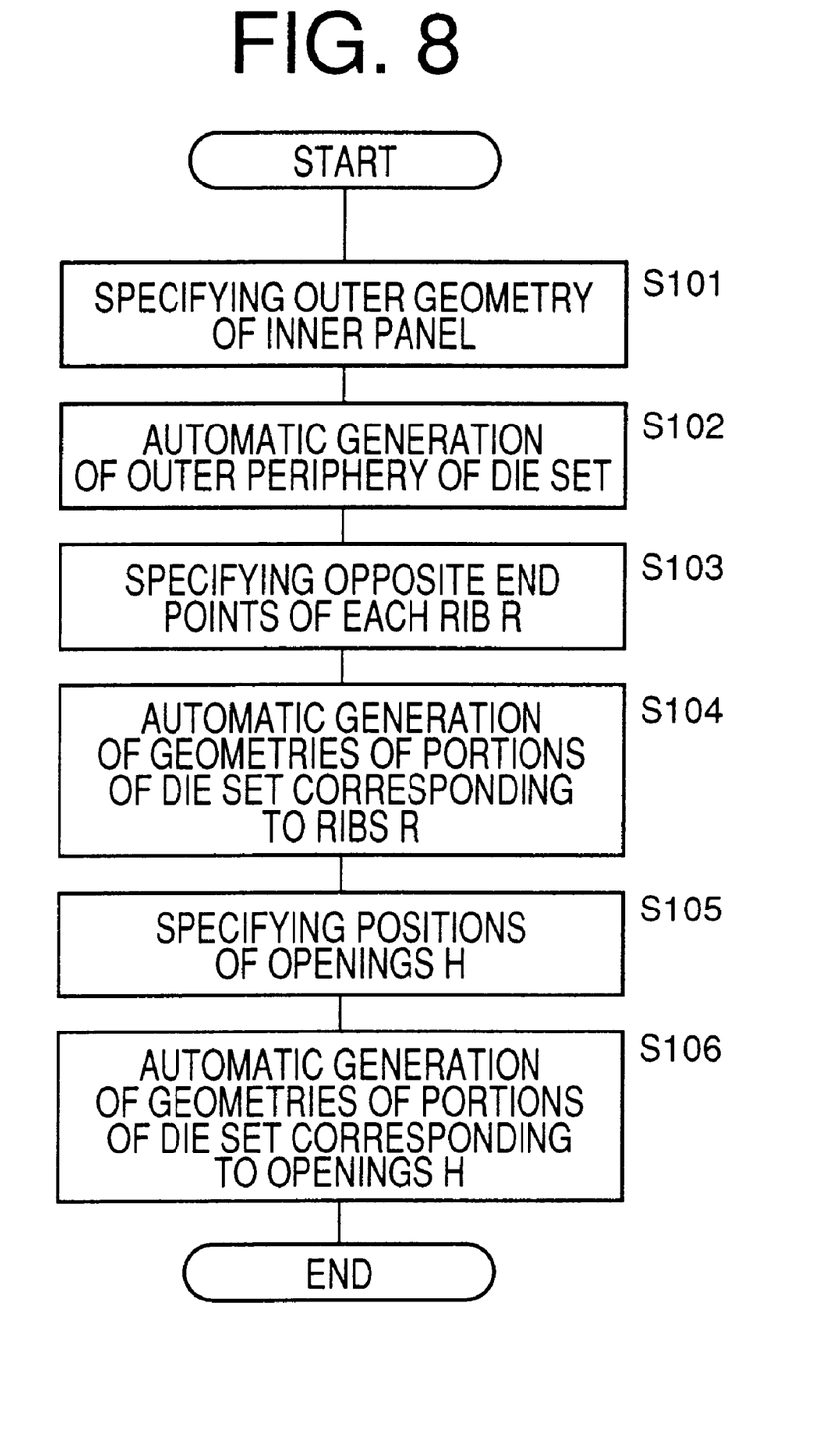
FIG. 8 is a flow chart illustrating a procedure for designing the die set for the inner panel of FIG. 7, with the aid of the CAD system.

Referring to the flow chart of FIG. 8, there will be described a procedure for designing the die set for the engine hood inner panel of FIG. 7, with the aid of the CAD system 44. Initially, the procedure is initiated with step S101 in which the operator of the CAD system 44 specifies the points A1–A10 as the product characteristic points CP. Step S101 is followed by step S102 in which the CAD system 44 automatically generates the outer profiles of the components 10, 12, 20 of the die set, on the basis of the product characteristic points CP (points A1-A10). Step S102 is followed by step S103 in which the operator specifies the opposite end points B1-B6 of the ribs R as the product characteristic points CP. Then, step S104 is implemented by the CAD system 44 to automatically generate the geometries 5 of the portions of the die set corresponding to the ribs R, on the basis of the characteristic points CP (points B1–B6).

Step S104 is followed by step S105 in which the operator specifies the substantially central points of the openings H as the characteristic points CP. Then, the CAD system 44 is operated in step S106 to automatically generate the geometries of the portions of the die set corresponding to the openings H, on the basis of the points CP.

The portions of the die set corresponding to the openings H may be automatically generated on the basis of the already generated geometries of the portions of the die set corresponding to the ribs R, rather than on the basis of the specified substantially central points of the openings H, and according to a predetermined relationship between the geometries of the portions of the die set corresponding to the openings H and the geometries of the portions of the die set corresponding to the ribs R.

It will be understood from the foregoing description of the present embodiment of this invention that the second designing step 34 of the die set designing process 31 can be initiated even before the designing of the product (e.g., inner panel of the engine hood) in the product designing process 30 is completed, that is, even before the outer profile of the product is determined in the product designing process 30. Accordingly, the overall designing time required for designing the product per se and the corresponding die set can be significantly reduced, because the die set designing process 31 is started during the product designing process 30.

Where the product geometry is changed in the product designing process 30 during or after the die set designing process 31, the die set geometry can be comparatively readily changed accordingly in a comparatively short time, by simply changing or re-specifying the product characteristic points CP and the functional characteristic points CF in the coordinate system. The present arrangement permits modification of the die set geometry in the subsequent die set designing process 31, as a result of an analysis of various aspects of the design of the product determined in the preliminary product designing process 30. Accordingly, the adequacy and quality of the product to be manufactured by pressing using the die set are significantly improved. Usually, the analysis of the product being developed requires a relatively long time, and the modification or improvement of the die set as a result of the analysis is conventionally difficult due to the time limitation. However, the product designing system according to the present embodiment of the invention permits relatively easy modification of the die set geometry in a relatively short time, in the die set designing process 31, as a result of the analysis of the originally designed product.

Further, since the components (upper and lower dies 10, 12 and pad 20) of the die set which have mutually relating geometric characteristics are generally represented by the selected product characteristic points CP, these components may be designed in relation to each other. For instance, a change of the geometry of one component of the die set results in automatic change of the geometries of the other components. Thus, the present arrangement is effective to prevent the conventional problems such as a failure to change the geometry of one component of the die set upon changing of the geometry of the other component, and erroneous or inadequate change of the geometry, whereby the required overall designing time is shortened owing to the elimination or reduction of the designing error or modification error.

In the illustrated embodiment, the operator of the CAD system 44 specifies or determines the product characteristic points CP and the functional characteristic points CF, on the basis of the geometric data received from the CAM system 40 of the product designing process 30 through the network, and the operator enteres the coordiante values of those points CP, CF through the input device 60. However, the geometric data need not be received from the CAD system 40 through the network, for the operator to specify the characteristic points. That is, the operator can specify the characteristic points CP, CF, provided the operator has the geometric data necessary to specify the characteristic points. For instance, the operator may receive, through a suitable communication means such as telephone or facsimile communication or mailing, the necessary geometric data from a location at which the product designing process 30 is performed. In this case, the CAD system 44 need not be connected to the CAD system 44 through an exclusive network. Further, the CAD system 40 may be adapted to send data representative of the coordinate values of the characteristic points to the CAD system 44, so that the operator simply manipulates the input device 60 to permit the coordinate value data to be used by the CAD system 44.

As described above, the present embodiment is adapted to design the die set used for manufacturing a product by pressing, in a CAD or CAM process, such that the reference points of the die set are determined in relation to the positions of the selected product characteristic points, and if necessary, such that the auxiliary function components of the die set are designed on the basis of the selected functional characteristic points. The coordinate values of the product characteristic points and the functional characteristic points may be used by the CAD or CAM system, for data communication between the preliminary product designing process and the subsequent die set designing process.

The present embodiment is suitably applicable to the designing of two or more products having similar geometries. If a product A of these products has already been designed with its characteristic points being given, another product B can be readily designed by simply modifying the characteristic points of the product A so as to meet the characteristics of the product B.

In the CAM process, the die set thus designed is prepared by first determining tool paths for machining workpieces to prepare the components of the die set, on the basis of the geometries of these components generated in the CAD process, and then machining the workpieces by feeding appropriate cutting tools along the determined tool paths. The CAD process for generating the geometry of the die set is considered to be a preliminary process, while the CAM process for controlling the tool paths according to the geometrical characteristics of the die set to prepare the die set is considered to be a subsequent process. If the CAM process is formulated to automatically determine tool paths on the basis of the geometry of the die set generated in the in the CAD process, the required overall CAD and CAM time for manufacturing the desired die set can be effectively minimized.

While the presently preferred embodiment of this invention has been described above in detail by reference to the accompanying drawing, for illustrative purpose only, it is to be understood that the invention is not limited to the details of the illustrated embodiment, but may be embodied with various changes, modifications and improvements, which may occur to those skilled in the art, without departing from the spirit and scope of the invention defined in the following claims:

What is claimed is:

1. A product designing system performing a plurality of designing processes including a preliminary process in which a geometry relating to one of a plurality of products having similar geometries is generated, and a subsequent process in which a geometry relating to a manufacturing device having a predetermined relationship in shape with said one of said plurality of products is generated on the basis of the geometry of said one product generated in said preliminary process, said manufacturing device being manufactured such that said manufacturing device has the zeometry generated in said subsequent process so that said one product is manufactured by using said manufactured manufacturing device, said product designing system comprising:

input means for entering, in said subsequent process, at least one geometrical characteristic of at least one selected portion of said one product whose geometry is similar to corresponding portions of the other of said plurality of products;

a memory storing data associated with a predetermined relationship between said at least one geometrical characteristic of said one product and said geometry relating to said manufacturing device, which geometry is to be generated in said subsequent process;

a designing device for generating the geometry relating to said manufacturing device in said subsequent process, on the basis of said at least one geometrical characteristic and according to said predetermined relationship data stored in said memory; and an output device for providing an output representative of said geometry relating to said manufacturing device.

2. A product designing system according to claim 1, wherein said at least one selected portion of said one product includes at least one of a peripheral portion, a reinforced portion and a perforated portion of said one product.

3. A product designing system according to claim 1, wherein said at least one selected portion of said one product includes a portion whose geometry is determined depending upon at least one of a required property of said portion, a function of said one product, and a geometry of any member with respect to which said one product is positioned during use.

4. A product designing system according to claim 1, wherein said manufacturing device comprises a plurality of members whose geometries relate to each other, and said designing device generates, in said subsequent process, the geometries of said plurality of members in relation to each other.

5. A product designing system according to claim 4, wherein said manufacturing device consists of a die set including an upper die and a lower die as said plurality of members, and said one product whose geometry is generated in said preliminary process is manufactured using said die set, said designing device automatically generating the geometries of said upper and lower dies in relation to each other.

6. A product designing system according to claim 1, wherein said at least one geometrical characteristic of said at least one selected portion of said one product includes at least one characteristic point defining at least one of a configuration, a size and a position of said at least one selected portion, each of said at least one characteristic point being defined by coordinate values in a coordinate system in which said object is defined.

7. A product designing system according to claim 1, wherein said one product whose geometry is generated in said preliminary process is manufactured by using one of a die set and a mold, and said manufacturing device consists of said one of said die set and said mold, whose geometry is generated in said subsequent process.

8. A product designing system according to claim 7, wherein said one product consists of a part of a body of a motor vehicle, and is manufactured by pressing using said die set, said die set including an upper die and a lower die.

9. A product designing system according to claim 7, wherein said at least one geometrical characteristic of said at least one selected portion of said one product includes at least one product characteristic point indicative of a position of each of at least one characteristic portion of said one product as said at least one selected portion, said designing device determining a reference position on the basis of the position of said each characteristic portion indicated by said at least one characteristic point, and generating a geometry of said one of said die set and said mold, on the basis of the determined reference position.

10. A product designing system according to claim 9, wherein said one of said die set and said mold includes at least one basic component which contributes to defining the geometry of said one product, and at least one auxiliary function component which relates to an operation of said one of said die set and said mold, said designing device receiving at least one functional characteristic point indicative of a position relating to a positional arrangement of said at least one auxiliary function component with respect to said at least one basic component, said designing device determining the position of each of said at least one auxiliary function component, on the basis of the position indicated by said at least one functional characteristic point.

11. A recording medium to be used for a product designing system adapted to perform a plurality of designing processes including a preliminary process in which a geometry relating to one of a plurality of products having similar geometries is generated, and a subsequent process in which a geometry relating to a manufacturing device having a predetermined relationship in shape with said one of said plurality of products is generated on the basis of the geometry of said one product generated in said preliminary process, said manufacturing device being manufactured such that said manufacturing device has the geometry generated in said subsequent process so that said one product is manufactured by using said manufacturing device manufactured, said recording medium storing a program such that said program is readable by a computer and is executed by said computer, in said subsequent process, for generating the geometry relating to said manufacturing device, on the basis of at least one geometrical characteristic of at least one selected portion of said one product whose geometry is similar to corresponding portion of the other of said plurality of products and is to be generated in said subsequent process, and according to a predetermined relationship between said at least one geometrical characteristic of said one product and said geometry relating to said.

12. A product designing system according to claim 1, wherein each of said at least one selected portion of said one product is selected as a portion of said one product which has the geometry to be generated at an initial stage of said preliminary process in which said geometry relating to said one product is generated, and said designing device initiates said subsequent process after the generation of the geometry of each of said at least one selected portion of said one product at said initial stage of said preliminary process, and before the completion of said preliminary process.

13. A product designing system according to claim 11, wherein each of said at least one selected portion of said one product is selected as a portion of said one product which has the geometry to be generated at an initial stage of said preliminary process in which said geometry relating to said one product is generated, and said program is executed by said computer to initiate said subsequent process after the generation of the geometry of each of said at least one selected portion of said one product at said initial stage of said preliminary process, and before the completion of said preliminary process.

14. A product designing system performing a plurality of designing processes including a preliminary process in which a geometry relating to one of a plurality of products having similar geometries is generated, and a subsequent process in which a geometry relating to a die set used for manufacturing said one of said plurality of products is generated on the basis of the geometry of said one product generated in said preliminary process, said die set including an upper die and a lower die whose geometries relate to each other, said product designing system comprising:

input means for entering, in said subsequent process, at least one geometrical characteristic of at least one selected portion of said one product whose geometry is similar to corresponding portions of the other of said plurality of products;

a memory storing data associated with a predetermined relationship between said at least one geometrical characteristic of said one product and said geometries of said upper and lower dies of said die set, which geometry is to be generated in said subsequent process;

a designing device for generating the geometries of said upper and lower dies of said die set in said subsequent process, in relation to each other, on the basis of said at least one geometrical characteristic and according to said predetermined relationship data; and an output device for providing an output representative of said geometries of said upper and lower dies.

15. A product designing system performing a plurality of designing processes including a preliminary process in which a geometry relating to one of a plurality of products having similar geometries is generated, and a subsequent process in which a geometry relating to an object associated with said one of said plurality of products is generated on the basis of the geometry of said one product generated in said preliminary process, said product designing system comprising:

input means for entering, in said subsequent process, at least one geometrical characteristic of at least one selected portion of said one product whose geometry is similar to corresponding portions of the other of said plurality of products, said at least one geometrical characteristic including at least one characteristic point defining at least one of a configuration, a size and a position of said at least one selected portion, each of said at least one characteristic point being defined by coordinate values in a coordinate system in which said object is defined;

a memory storing data associated with a predetermined relationship between said at least one geometrical characteristic of said one product and said geometry relating to said object, which geometry is to be generated in said subsequent process;

a designing device for generating the geometry relating to said object in said subsequent process, on the basis of said at least one geometrical characteristic and according to said predetermined relationship data; and an output device for providing an output representative of said geometry relating to said object.

16. A product designing system performing a plurality of designing processes including a preliminary process in which a geometry relating to one of corresponding parts of a plurality of motor vehicle bodies which parts have similar geometries is generated, and a subsequent process in which a geometry relating to a die set including an upper die and a lower die used for manufacturing by pressing said one of the corresponding parts of said plurality of motor vehicles bodies is generated on the basis of the geometry of said one part generated in said preliminary process, said product designing system comprising:

input means for entering, in said subsequent process, at least one geometrical characteristic of at least one selected portion of said one part of the motor vehicle bodies whose geometry is similar to corresponding portions of the other of said corresponding parts of the motor vehicle bodies;

a memory storing data associated with a predetermined relationship between said at least one geometrical characteristic of said one part and said geometry relating to said die set, which geometry is to be generated in said subsequent process;

a designing device for generating the geometry relating to said die set in said subsequent process, on the basis of said at least one geometrical characteristic and according to said predetermined relationship data; and     an output device for providing an output representative of said geometry relating to said die set.

17. A product designing system performing a plurality of designing processes including a preliminary process in which a geometry relating to one of a plurality of products having similar geometries is generated, and a subsequent process in which a geometry relating to one of a die set and a mold used for manufacturing said one of said plurality of products is generated on the basis of the geometry of said one product generated in said preliminary process, said product designing system comprising:

input means for entering, in said subsequent process, at least one geometrical characteristic of at least one selected portion of said one product whose geometry is similar to corresponding portions of the other of said plurality of products, said at least one geometrical characteristic including at least one product characteristic point indicative of a position of each of at least one characteristic portion of said one product as said at least one selected portion;

a memory storing data associated with a predetermined relationship between said at least one geometrical characteristic of said one product and said geometry relating to said object, which geometry is to be generated in said subsequent process;

a designing device for generating the geometry relating to said object in said subsequent process, on the basis of said at least one geometrical characteristic and according to said predetermined relationship data, said designing device determining a reference position on the basis of the position of said each characteristic portion indicated by said at least one characteristic point, and generating a geometry of said one of said die set and said mold, on the basis of the determined reference position; and     an output device for providing an output representative of said geometry relating to said object.

18. A product designing system performing a plurality of designing processes including a preliminary process in which a geometry relating to one of a plurality of products having similar geometries is generated, and a subsequent process in which a geometry relating to a manufacturing device having a predetermined relationship in shape with said one of said plurality of products is generated on the basis of the geometry of said one product generated in said preliminary process, said manufacturing device being manufactured such that said manufacturing device has the geometry generated in said subsequent process so that said one product is manufactured by using said manufacturing device manufactured, said product designing system comprising:

input means for entering, in said subsequent process, at least one geometrical characteristic of at least one selected portion of said one product whose geometry is similar to corresponding portions of the other of said plurality of products, each of said at least one selected portion of said one product is selected as a portion of said one product which has the geometry to be generated at an initial stage of said preliminary process in which said geometry relating to said one product is generated;

a memory storing data associated with a predetermined relationship between said at least one geometrical characteristic of said one product and said geometry relating to said manufacturing device, which geometry is to be generated in said subsequent process; and     a designing device for generating the geometry relating to said manufacturing device in said subsequent process, on the basis of said at least one geometrical characteristic and according to said predetermined relationship data stored in said memory, said designing device initiating said subsequent process after the generation of the geometry of each of said at least one selected portion of said one product at said initial stage of said preliminary process, and before the completion of said preliminary process.

19. A product designing system according to claim 18, further comprising an output device for providing an output representative of said geometry relating to said manufacturing device.

* * * * *